US005944946A

United States Patent [19]

Downing et al.

[11] Patent Number: 5,944,946

[45] **Date of Patent: *Aug. 31, 1999**

[54] APPARATUS AND PROCESS FOR PERIMETER PRESSURE SEALING

[75] Inventors: Richard S. Downing, Grand Island, N.Y.; John E. Traise, Palm Bay, Fla.

[73] Assignee: Moore Business Forms, Inc., Grand Island, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/882,234

[22] Filed: Jun. 25, 1997

Related U.S. Application Data

[60] Continuation of application No. 08/453,427, May 30, 1995, abandoned, which is a division of application No. 08/134,853, Oct. 12, 1993, which is a continuation-in-part of application No. 07/417,775, Oct. 6, 1989, Pat. No. 5,397,427.

[51] Int. Cl.[6] .......... B32B 31/00

[52] U.S. Cl. .......... 156/553; 156/555; 156/441.5

[58] Field of Search .......... 156/290, 291, 156/292, 479, 548, 553, 555, 556, 441.5; 100/153, 176

[56] References Cited

U.S. PATENT DOCUMENTS

| | | | |
|---|---|---|---|
| 426,728 | 4/1890 | Maret . | |
| 891,701 | 6/1908 | Jennings . | |
| 2,190,413 | 2/1940 | Davidson . | |
| 2,234,223 | 3/1941 | Ball . | |
| 2,331,054 | 10/1943 | Shively . | |
| 2,362,819 | 11/1944 | Hinchey . | |
| 2,893,468 | 7/1959 | Fieroh . | |
| 3,006,257 | 10/1961 | Orsini . | |
| 3,068,933 | 12/1962 | Klar . | |
| 3,152,800 | 10/1964 | Hanson . | |
| 3,449,196 | 6/1969 | Yumoto et al. . | |
| 3,527,632 | 9/1970 | Holes et al. . | |
| 3,540,970 | 11/1970 | Huntwork . | |
| 3,727,908 | 4/1973 | Whitesell et al. . | |
| 3,749,631 | 7/1973 | Batchelder et al. | 156/555 X |
| 3,953,272 | 4/1976 | Webber . | |
| 4,033,807 | 7/1977 | Neill et al. . | |
| 4,325,773 | 4/1982 | Schulz . | |
| 4,343,129 | 8/1982 | Gunther, Jr. et al. . | |
| 4,350,555 | 9/1982 | Popoff . | |
| 4,426,035 | 1/1984 | Dieckow . | |
| 4,461,661 | 7/1984 | Fabel . | |
| 4,466,228 | 8/1984 | Gess . | |
| 4,540,458 | 9/1985 | Baughman et al. . | |
| 4,557,377 | 12/1985 | Maloney . | |
| 4,721,501 | 1/1988 | Herrington . | |
| 4,721,502 | 1/1988 | Herrington . | |
| 4,768,411 | 9/1988 | Su . | |
| 4,826,475 | 5/1989 | Eweryd . | |
| 4,861,414 | 8/1989 | Vogan . | |
| 4,919,738 | 4/1990 | Ball et al. . | |
| 4,928,807 | 5/1990 | Auerbach | 198/379 |
| 5,169,489 | 12/1992 | Kalisiak et al. | 156/555 |

FOREIGN PATENT DOCUMENTS

| | | |
|---|---|---|
| 0 448 271 A1 | 9/1991 | European Pat. Off. . |
| 1.503.822 | 12/1967 | France . |
| WO 87/02943 | 5/1987 | WIPO . |

*Primary Examiner*—James Engel
*Attorney, Agent, or Firm*—Nixon & Vanderhye, P.C.

[57] ABSTRACT

Method and apparatus for activating longitudinal and transverse pressure sensitive adhesive strips in marginal edge portions of paper business forms are disclosed in the form of one or more roll sets which are formed to activate both the longitudinal and transverse strips while the form travels in a single orientation in a single direction that is parallel to the grain direction of the paper.

8 Claims, 2 Drawing Sheets

FIG. 1
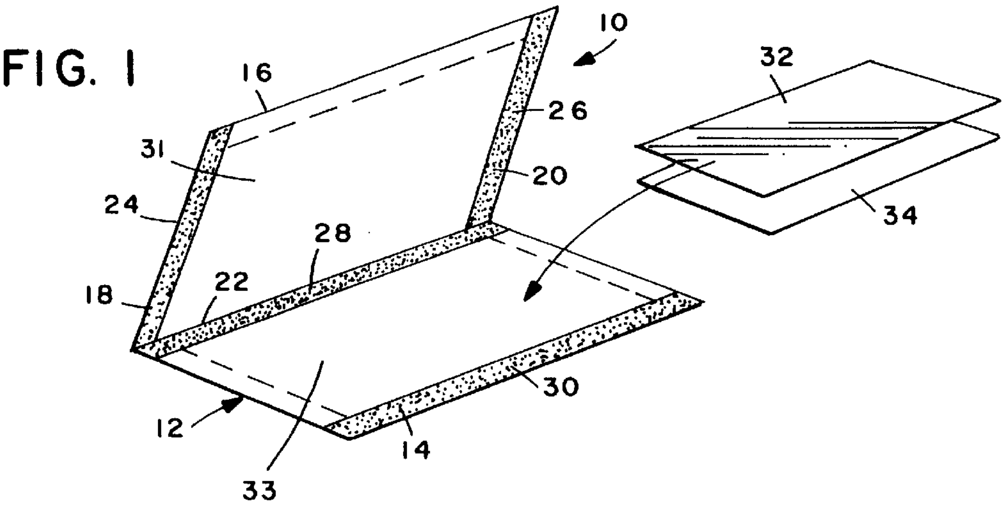
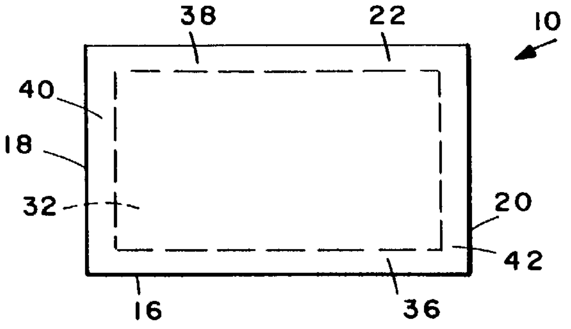
FIG. 2
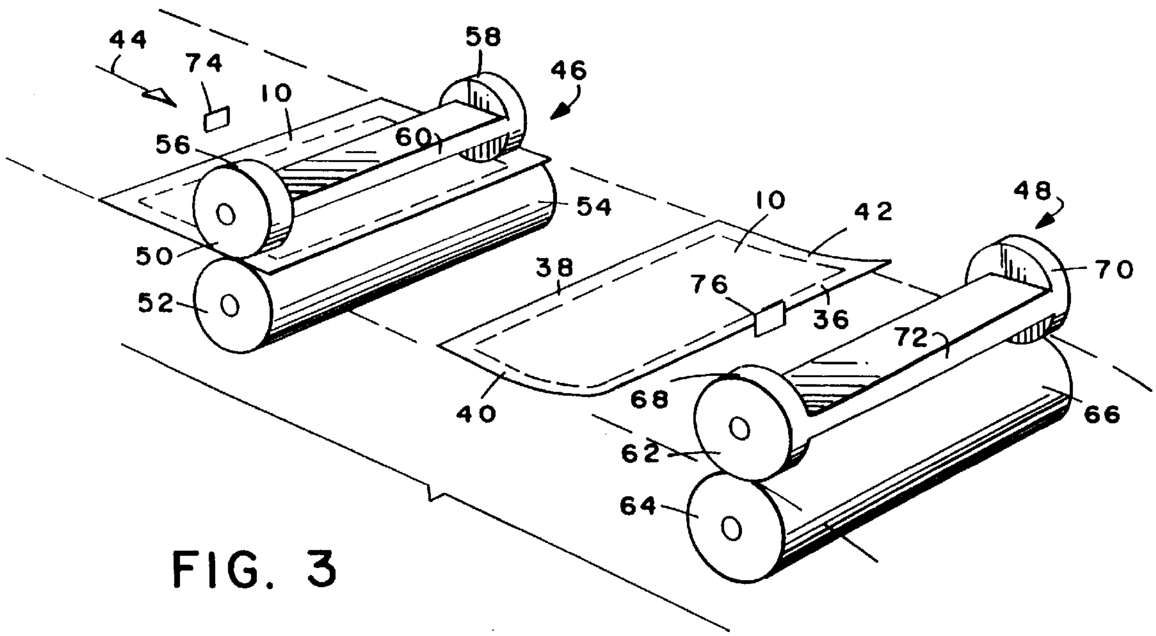
FIG. 3

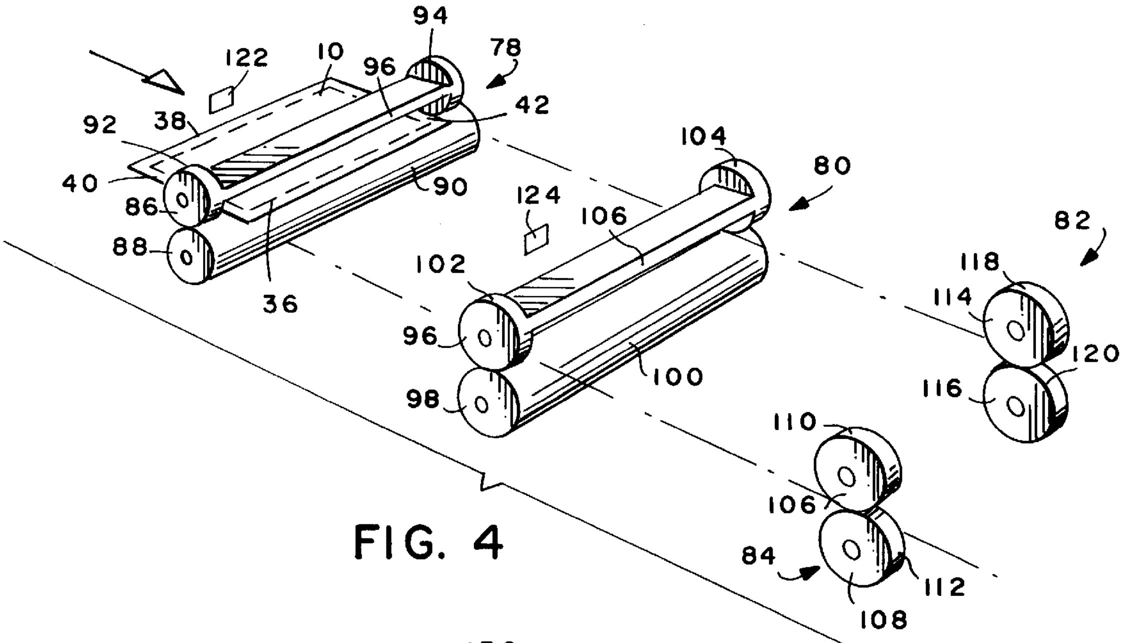
FIG. 4
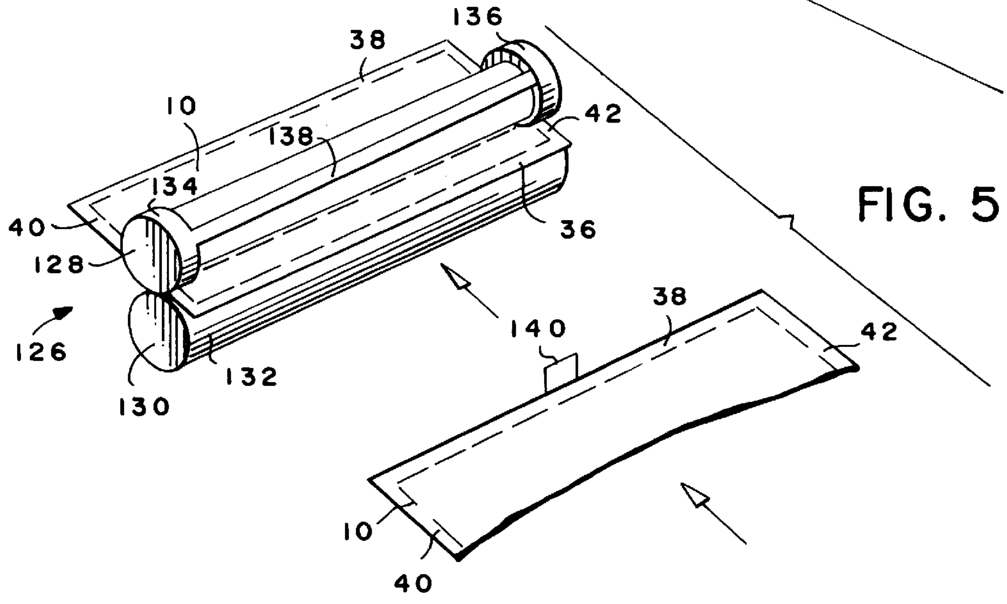
FIG. 5
FIG. 6
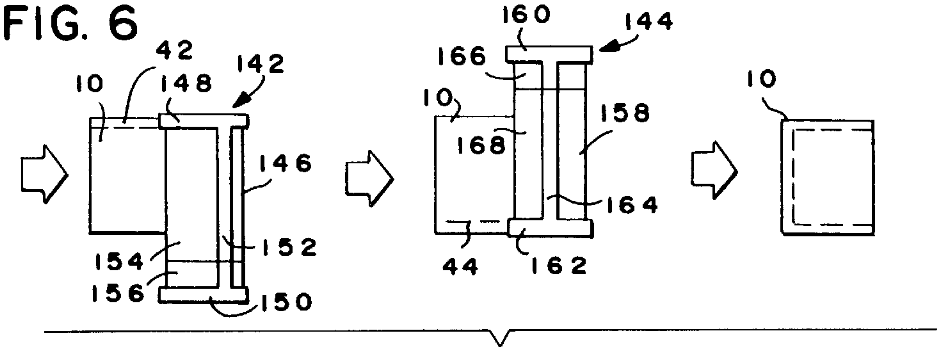

APPARATUS AND PROCESS FOR PERIMETER PRESSURE SEALING

This is a continuation of application Ser. No. 08/453,427, filed May 30, 1995, now abandoned, which is a division of Ser. No. 08/134,853, filed Oct. 12, 1993, which is a continuation in part of Ser. No. 07/417,775 filed Oct. 6, 1989, now U.S. Pat. No. 5,397,427.

BACKGROUND AND SUMMARY OF THE INVENTION

In the manufacture of business forms, it is almost always necessary to seal one part of the form construction with respect to another. This is typically accomplished by utilizing an adhesive which acts between the two portions of the business form to be fixed together. Oftentimes, heat activated adhesives are utilized, but in many circumstances it is desirable to utilize pressure sensitive adhesives.

A sealing system for business forms used with one type of pressure sealing adhesive requires that the adhesive applied to the forms during manufacture be capable of cohesive bonding to a fiber tearing strength when pressure sealed after computer printing by the end user, but must be entirely free of adhesive bonding under all conditions of normal handling during manufacture, storage and imaging. Thus the margins of pressure applied to the paper during normal handling, and the pressure applied to effect fiber tearing bonds are widely separated.

A typical pressure sealing piece of equipment for use with business forms uses a multiple roll sealing system to apply pressure to the entire web (or the entire individual sheets) being processed. Those rolls are capable of exceeding the threshold unit pressure required, which is quite high, typically about 200 lbs. per lineal inch of paper width when using a succession of two or three pressure couples. This requires a very rigid yet accurate mechanical system. While the application of such high forces requires massive and precise construction of the sealer, it is also necessary that the web or sheet manifold be clean—that is that there be no disturbances in the surface configuration. Therefore it is extremely difficult to utilize such equipment with inserts, window patching, folds internal to the form, etc., since such build ups in thickness or non-uniformities in the surface characteristics decrease the unit pressure at the sealing edges and could increase the sealing pressure in the inclusion area so that a jam or physical tearing of the sheet occurs. When inserts are provided, there also is the problem of “tenting” or “pillowing”.

In commonly assigned parent application Ser. No. 07/417,775 filed Oct. 6, 1989, expressly incorporated herein by reference, a method and apparatus are provided that overcome certain of the problems associated with full-width pressure sealing systems by making it possible to continuously, and at high speed, act upon business forms including those having inserts, window patching, folds internal to the forms, and other surface non-uniformities. The “pillowing” effects (where the sealed manifold is forced apart), and the “tenting” effects (where various plies of the assembly shift relative to each other and thereby prevent formation of a completely flat form) are substantially avoided.

The general manner in which these results are accomplished according to the above identified application is by effecting sealing along only the pressure sensitive adhesive strips of the business forms—rather than along the entire surface of the forms. This allows the coupling force between each sealing roll pair to be reduced from about 1,000 lbs. in the prior art, to about 100–200 lbs., dependent on the ratio of total form width to sealing bond width. This also allows production of a system that is much less massive than conventional, and one that is reliable and simple and easy to utilize.

There may be disadvantages in the above described system, however. For example, in order to apply pressure to adhesive strips extending transverse to the longitudinal edges of the form, the latter is turned ninety degrees and fed sideways through a second sealer. In other words, longitudinal edge sealing is achieved with the forms passing between a roll pair in the grain direction, while a second roll pair acts on the form in a direction 90° from the grain direction. While the concept of narrow pairs of rollers under high pressure effect the seal of the perimeter of forms with inserts quite satisfactorily in the grain direction, some wrinkling can occur in the direction perpendicular to the grain direction.

The objective of the invention is to expand the concept of perimeter sealing as disclosed in the above identified co-pending application by applying sealing pressure to both the longitudinal and transverse adhesive strips while the forms are traveling in a single orientation and in a single direction, i.e., the grain direction of the paper.

It will be appreciated, however, that the transversely extending sealing strips, which will usually be of greater length than the transverse sectional length of the longitudinally extending margin strips, will require greater force between the cooperating rotary couples (or roll pairs) to effect the same unit pressure. For example, an 11" wide document, with a 10½" transverse sealing length, and with two marginal strips each ½" wide (for a total of 1") will require 10.5/1 or 10.5 times the force to effect the same sealing pressure on the transverse strip as on the longitudinal margin strips. This can be accomplished if separate longitudinal sealing wheels and transverse sealing segments are used, by simply so selecting the spring force necessary to impact the desired sealing pressure of about 150 pounds per lineal inch.

In the case of a combined longitudinal/transverse sealing wheel, this same result could be accomplished by providing a slightly reduced diameter on the longitudinal sealing portion of the sealing wheel to thereby reduce the effective unit pressure on the longitudinally extending strips to more nearly approximate or equal the unit pressure on the transverse sealing strips.

Thus, in accordance with one exemplary embodiment, perimeter sealing of the form is achieved by two sets of spring-loaded roll pairs, the upper roller of each set having enlarged circumferential sealing surfaces at opposite ends thereof for sealing the longitudinal marginal edge portions of the form, and a transverse sealing bar extending between the longitudinal sealing surfaces for sealing the transverse marginal edge portions of the form.

In this arrangement, the form is fed toward the roll pairs until the forward edge of the form engages a stop gate which serves to establish proper timing and registration for the form relative to the transverse sealing bar of the first roll pair. Upon retraction of the gate, the form will be fed between the rollers of the first roll pair to thereby activate the pressure sensitive adhesive along the forward transverse marginal edge and the longitudinal edges of the form. After the form has passed completely through the first roll pair, it engages a second stop gate where timing and registration is again established to insure engagement of the second transverse sealing bar with the second or rearward transverse marginal edge of the form. Upon retraction of the second gate, the form passes between the rollers of the second roll pair to activate the pressure sensitive adhesive along the rearward transverse marginal edge, while at the same time, the longitudinal marginal edge portions of the form are again pressed in a redundant or back-up sealing action.

It will be appreciated that the spacing between the two roll pairs in the direction of travel of the forms may be adjusted as required. At the same time, sequencing and control of the gate stops and the drive means of the two roll pairs may be accomplished electronically or mechanically in accordance with conventional control technology. As a result, the rotational velocity of the rollers and the rate of feed of the forms may be coordinated so as to permit the two roll pairs as described above to longitudinally and transversely seal business forms of virtually any length, but with a fixed width.

In a second exemplary embodiment, the longitudinal edge sealing and transverse edge sealing of each successive form is carried out separately, i.e., with two roll pairs effecting transverse edge sealing, substantially as described above, and two pair of laterally aligned rollers upstream or downstream of the two transverse edge sealing roll pairs for effecting longitudinal edge sealing. These longitudinal edge sealing rollers are of the type described, for example, in the pending parent application. In this second embodiment, the transverse edge sealing rollers have lengths greater than the widths of the forms so that the enlarged circumferential edges of the upper rollers directly engage surfaces of associated lower rollers, and so that the forms pass between but out of contact with these enlarged edge surfaces. Thus, the enlarged edge surfaces have a bearing function only, without any pressure sealing function.

Here again, this arrangement may be adapted to handle any length form. In addition, since the transverse edge sealing rollers have lengths greater than the width of the forms, the apparatus as described in this second embodiment can accommodate forms of different widths when combined with laterally adjustable longitudinal edge sealing rollers.

In a third exemplary embodiment of the invention, a single roll pair may be employed to seal both the longitudinal and transverse edges of each form. In this embodiment, the upper roller of the roll pair has raised circumferential edge surfaces for sealing the longitudinal edges of the forms, and a single raised transverse edge sealing bar. Stated otherwise, the upper roller is relieved in those areas corresponding to the center area of the form, within the transverse and longitudinal marginal edges thereof. This embodiment is intended for dedicated applications, i.e., where single length and single width forms are to be processed. Thus, the transverse sealing bar and the form feed will be adjusted so that the transverse sealing bar pressure activates the forward transverse seal and, upon rotation through 360°, the same bar will pressure activate the rearward transverse seal. At the same time, the longitudinal edge seals are pressure activated by the raised circumferential surfaces at either end of the upper roller.

It will be appreciated from the above that the circumference of the pressure roller will be substantially identical to the form length.

In a fourth exemplary embodiment, two sets of length-adjustable roll pairs are provided in spaced relationship, in the direction of movement of the forms, each set having a longitudinal edge and transverse edge sealing function. This embodiment permits perimeter sealing of forms having different lengths and different widths.

To this end, the rollers of each roll pair are of a telescoped construction so that the length thereof may be adjusted to accommodate forms of different widths.

In each of the above described embodiments where longitudinal and transverse sealing surfaces are provided on a single roller, the longitudinal edge sealing surfaces may have slightly reduced diameters (or radii) as compared to the intermediate roll diameter (or radius, as determined by the distance from the roll center axis to the transverse sealing surface) in order to more nearly equalize the longitudinal and transverse sealing pressures.

Thus, in its broader aspects, the present invention relates to a method of handling business forms, each having at least two strips of pressure sensitive adhesive of a predetermined width for fixing one part of the business form to another part, and wherein one of the strips of pressure sensitive adhesive extends substantially perpendicularly to the other, comprising the step of (a) automatically, in a continuous, sequential manner, acting on successive business forms aligned in a predetermined orientation and fed in one direction of movement to apply a force thereto sufficient to activate the pressure sensitive adhesive to fix one part of the form to another, the force being applied only to the approximate area of the predetermined widths of the two strips of pressure sensitive adhesive, without having to alter the predetermined orientation or one direction of movement.

From an apparatus standpoint, the invention relates broadly to a system for pressure activation of a plurality of pressure sensitive adhesive strips located in marginal edge portions of a business form, wherein at least two of the plurality strips are arranged perpendicular to each other, the apparatus comprising: a first roll set for activating one of the two pressure sensitive adhesive strips; a second roll set for activating the other of the two pressure sensitive adhesive strips, wherein the first and second roll sets rotate about parallel axes.

In a related aspect, the invention relates to apparatus for pressure activation of first and second longitudinally extending pressure sensitive adhesive strips located in longitudinal marginal edge portions of a business form, and third and fourth transversely extending pressure sensitive adhesive strips located in transverse marginal edge portions of the business form, the apparatus comprising: a first roll pair including upper and lower rollers, one of the upper and lower rollers formed with enlarged end portions and a first transverse sealing surface extending between the enlarged end portions for activating one of the third and fourth transversely extending pressure sensitive adhesive strips; a second roll pair including upper and lower rollers, one of the upper and lower rollers being formed with enlarged end portions and a second transverse sealing surface extending between the enlarged end portions for activating the other of the third and fourth transversely extending pressure sensitive adhesive strips.

Other objects and advantages of the invention will become apparent from the detailed description which follows.

BRIEF DESCRIPTION OF THE DRAWINGS

FIG. 1 is a perspective, exploded view of a business form of the type to be sealed in accordance with the invention;

FIG. 2 is a plan view of the form shown in FIG. 1 but in assembled form;

FIG. 3 is a perspective view of a perimeter pressure roll configuration in accordance with a first embodiment of the invention;

FIG. 4 is a perspective view of a perimeter pressure roll configuration in accordance with a second embodiment of the invention;

FIG. 5 is a perspective view of a perimeter pressure roll configuration in accordance with a third embodiment of the invention; and FIG. 6 is a perspective view of a perimeter pressure roll configuration in accordance with a fourth embodiment of the invention.

DETAILED DESCRIPTION OF THE DRAWINGS

With reference now to FIG. 1, a typical business form 10 of the type which may be handled in accordance with this invention includes a sheet 12 having a forward edge 14, a rearward edge 16, and parallel side edges 18, 20. The sheet also includes a transversely extending fold line 22 which becomes the rearward edge of the form when folded, while rearward edge 16 becomes the forward edge, in alignment with edge 14.

The form is provided with longitudinally extending pressure sensitive adhesive strips 24, 26 extending between the edge 16 and the fold line 22, and transversely extending pressure sensitive adhesive strips 28, 30 extending transversely along the fold edge 22 and along the forward edge 14, respectively. This arrangement provides a complete perimeter seal about the form 10 when the latter is folded, as best seen in FIG. 2.

The form 10 is designed to receive one or more inserts 32, 34, the inserts being sized so that they do not come into contact with any of the above described adhesive strips.

With reference now especially to FIG. 2, after the inserts 32, 34 have been located within the form 10, in an area inside the marginal portions thereof, and after folding of the sheet 12 about the fold line 22 (it is not relevant here whether the inserts are placed in the form before or after folding), the assembled form comprises upper and lower plies 31, 33 enclosing one or more inserts 32, 34 and is in condition for perimeter pressure sealing which is to take place along the transverse marginal edges portions 36, 38 and the longitudinal marginal edge portions 40, 42. It will be understood, of course, that the transverse and longitudinal marginal edge portions correspond to the width of the individual pressure sensitive adhesive strips 24, 26, 28 and 30. It should be understood further that the relative transverse and longitudinal dimensions as shown in the drawings are exemplary only.

It will also be appreciated that a plurality of forms 10 may be interconnected by transverse score lines (or perforation lines) in continuous web form, with longitudinally extending and removable marginal edge portions having apertures for engaging a conventional tractor feed mechanism as will be understood by those skilled in the art. Alternatively, the forms 10 may be fed individually, in succession, by conventional pressure feeding mechanisms.

With reference now to FIG. 3, an arrangement in accordance with a first exemplary embodiment of the invention is illustrated for effecting perimeter pressure sealing of a plurality of successive forms 10. Specifically, a first roll pair 46 includes an upper longitudinal edge sealing roller 50, and a lower cooperating pressure roller 52. The lower roller has a substantially smooth circumferential surface 54 extending along the full length of the roller. The upper longitudinal edge pressure sealing roller 50 is formed with enlarged opposite ends including longitudinal edge sealing surfaces 56, 58 and a transverse bar including a transverse sealing surface 60 extending between the enlarged ends. It will be understood that the sealing surface 60 may lie flush with the longitudinal edge sealing surfaces 56, 58. The roll pair as described above, is preferably spring loaded (in the manner disclosed, for example, in the commonly assigned parent application) to permit the introduction of a form 10 between the rollers of the roll pairs during the perimeter sealing operation.

It will be appreciated, however, that, absent some accommodation, the sealing pressure applied by the longitudinal edge sealing surfaces 56, 58 will be greater than the transverse sealing effected by transverse sealing bar surfaces 60, 72. In other words, and with reference to FIG. 3, the longitudinal sealing surfaces 56, 58, 68 and 70 would apply a high unit pressure when measured in pounds per square inch. When the roller rotates to contact the transverse sealing bar surfaces 60 and 72, the pounds per square inch drops substantially under the same spring loading because the sealing surface area has increased substantially. One way to overcome this problem is to reduce very slightly the diameter of the longitudinal sealing surfaces 56, 58, 68 and 70, leaving the transverse sealing bar surfaces 60 and 72 slightly raised relative to the longitudinal sealing surfaces, so that when the cylinders revolve to the transverse sealing portion, a greater amount of unit pressure would be applied to bar surfaces 60 and 72, so as to more nearly equalize the longitudinal and transverse sealing pressures. Thus, the relative longitudinal and transverse sealing surfaces can be varied as a function of the amount of diameter reduction in the longitudinal sealing surface portions of the roller. This technique for equalizing longitudinal and transverse sealing pressures can be utilized in any of the embodiments described herein which employ rollers having both longitudinal and transverse sealing surfaces.

It will also be appreciated that the widths of the longitudinal edge sealing surfaces 56, 58 are substantially equal to the widths of the longitudinal marginal edge portions 40, 42 (FIG. 2), and the width of the transverse sealing bar surface 60 is substantially identical to the width of the leading transverse marginal portion 36. This arrangement insures that the high pressures necessary to effect the activation of the pressure sensitive adhesive strips will not be brought to bear on any portion of the inserts 32, 34 located between the upper and lower sheets of the form 10.

Downstream of the roll pair 46, there is located an identical roll pair 48 which includes an upper sealing roller 62 and a lower pressure roller 64, the latter having a substantially smooth circumferential surface 66 extending the full length of the roller. Similar to the roller 50, the roller 62 includes longitudinal marginal edge sealing surfaces 68, 70 located at opposite ends of the roller 62, and a transverse surface 72 extending between the enlarged end portions, the surface 72 being flush with surfaces 68 and 70.

A stop gate 74 is located upstream of the first roll pair 46 and a second stop gate 76 is located upstream of the second roll pair 48 for a purpose described further hereinbelow.

In order to activate the pressure sensitive adhesive strips 24, 26, 28 and 30 located about the periphery of the form 10, the form is initially fed to a first stop location at a stop gate 74. This enables the form 10 to be properly registered, and the timing of the form feed with the roller actuation to be timed, so that, upon lowering of the stop gate 74, the form will be introduced into the nip between rollers 50, 52 so that the transverse sealing surface 60 of roller 50 will engage the form 10 precisely at the forward transverse marginal edge portion 36 so as to activate the pressure sensitive adhesive strip 30. At the same time, the longitudinal edge sealing surfaces 56, 58 of roller 50 apply pressure along the longitudinal marginal edge portions 40, 42 to activate the pressure sensitive adhesive strips 24, 26.

Upon exiting the first roll pair 46, the form 10 is fed to a second stop gate 76 which enables timing and registration vis-a-vis the second roll pair 48. At the appropriate time, the gate 76 is lowered so that the form 10 may be introduced into the nip between rollers 62, 64. The coordination between the feed means and the roll actuation means insures that the transverse edge sealing surface 72 of roller 62 will engage the rearward transverse marginal edge portion 38 of the form 10. During this rearward transverse edge sealing step, the longitudinal edge sealing surfaces 68, 70 of roller 62 carry out a redundant pressure sealing step as they engage the longitudinal edge marginal portions 40, 42 which have already been sealed during passage through the first roll pair 46.

By a judicious spacing of the roll pairs 46, 48 in the direction of movement of the forms 10, and through effective control of the form feed and roller drive means, it will be appreciated that the arrangement illustrated in FIG. 3 can effect perimeter edge sealing of forms of virtually any length, but with a fixed width. At the same time, the arrangement illustrated in FIG. 3 enables the form 10 to be sealed not only along the longitudinal marginal edge portions 40, 42, but also along the forward and rearward transverse marginal edge portions 36, 38 while the form 10 continues to travel in a single direction, i.e., in a preferred direction that is parallel with the grain of the paper. This, then, eliminates the possible wrinkling of the form as may be experienced in systems where the form changes direction between longitudinal edge sealing and transverse edge sealing, such as in the above identified co-pending parent application.

With reference now to FIG. 4, a second exemplary embodiment of the invention is illustrated wherein three successive roll pairs 78, 80, 82 are arranged longitudinally along the direction of travel of a plurality of forms 10. In this second exemplary embodiment, the first roll pair 78 includes upper and lower rollers 86, 88, the latter having a substantially smooth circumferential surface 90. The upper roll 86 has enlarged ends with bearer surfaces 92, 94 which directly engage the circumferential surface 90 of the roller 88. A transverse sealing bar having a transverse edge sealing surface 96 extends between the enlarged end portions of the upper roll 86.

The second roll pair 80, located downstream of the first roll pair 78 a distance greater than the length of the form 10, includes upper and lower rollers 96, 98, the latter having a substantially smooth circumferential surface 100 extending along the length of the roller. The upper roller 96 includes enlarged end surfaces with substantially smooth bearer surfaces 102, 104 which directly engage the circumferential surface 100 of the roller 98. Extending between the enlarged end portions of the roller 96, there is a transverse edge sealing bar having a transverse edge sealing surface 106.

Further downstream of the second roll pair 80, a distance greater than the length of the form 10, there are laterally aligned roll pairs 82, 84. The roll pair 82 includes an upper roll 106 and a lower roll 108. The upper roller has a substantially smooth circumferential edge sealing surface 110, while the lower roller has a substantially smooth, circumferential surface 112. The laterally aligned roll pair 82 includes an upper roller 114, and a lower roller 116, having upper and lower circumferential edge sealing surfaces 118, 120, respectively. The width of each of the rollers 106, 108, 114, 116, corresponds substantially precisely to the width of the longitudinally extending pressure sensitive adhesive strips 24, 26 in the marginal edge portions 40, 42 of the form 10.

In the above described second exemplary embodiment, the axial length of each roller 86, 88, 96 and 98 of the first and second roll pairs 78, 80 is longer than the width of the forms 10 to be fed between the rollers. In other words, the circumferential edge surfaces 92, 94 and 102, 104 of the upper rollers 86, 96, respectively, do not engage the forms 10 (they bear directly on surfaces 90, 100) and have no function with respect to activation of the pressure sensitive adhesive strips 24, 26 located along the longitudinal marginal edge portions of the form.

In order to effect longitudinal edge sealing of the forms 10, the downstream roll pairs 82, 84 are laterally aligned to correspond to the width of the forms 10.

In operation, forms 10 are fed into engagement with an initial stop gate 122 upstream of the first roll pair 78. Upon registration and coordination with the roller drive means, the gate 122 is lowered to permit the form 10 to be introduced into the nip between the rollers 86, 88 where transverse marginal edge sealing along the forward marginal edge portion 36 of the form is effected by the transverse edge sealing surface 96 of the upper roller 86 as it exerts pressure on pressure sensitive adhesive strip 30. Upon exiting the first roll pair 78, the form will proceed downstream until it engages a second stop gate 124 which permits proper registration and timing relative to the second roll pair 80. When the gate 124 is lowered, the form 10 is introduced between the nip of rollers 96, 98 and the transverse sealing surface 106 will activate the pressure sensitive adhesive strip 28 along the rearward marginal edge portion 38 of the form 10.

After exiting the second roll pair 80, the forms 10 pass between the longitudinal edge sealing roll pairs 82, 84 to activate the pressure sensitive adhesive strips 24, 26 along the longitudinal marginal edge portions 40, 42 of successive forms.

By this alternative arrangement, forms of a wide variety of lengths may be processed through the system with perimeter sealing effectively carried out, again, without having to change the orientation or direction of the form.

With reference now to FIG. 5, a third exemplary embodiment of the invention is shown which includes a single roll pair 126 including an upper roller 128 and a lower roller 130, the latter having a substantially smooth circumferential surface 132 extending between the opposite ends of the roller. The upper roll 128 is provided with enlarged ends having longitudinal edge sealing surfaces 134, 136 and a transverse sealing bar including a transverse edge sealing surface 138 extending between and flush with the longitudinal sealing surfaces 128, 136. It will be appreciated that the upper roll 128 may be formed from a cylindrical roller, with areas between the pressure sealing surfaces removed to form the pattern of sealing surfaces as shown in FIG. 5.

In this arrangement, the roll pair 126 is dedicated to a specific length and width form 10 and is particularly useful for users who distribute large numbers of forms of a single size. In other words, the longitudinal edge sealing surfaces 134, 136 of the roller 128 are sized specifically to handle a form 10 with longitudinally extending pressure sensitive adhesive strips 24, 26 which are spaced precisely the same distance apart as the longitudinal edge sealing surfaces 128, 136. In addition, the circumference of the upper roller 128 is chosen so that the transverse sealing surface 138 will engage the forward transverse marginal edge portion 36 of the form 10 as the form is introduced into the nip between the rollers, and upon rotation of 360°, the surface 138 will engage the rearward transverse marginal edge portion 38, to thereby activate the associated pressure sensitive adhesive strips 30, 28.

Here again, a stop gate 140 is utilized in order to properly register and align each successive form 10 with the roller pair 126 to insure precise engagement of the pressure sensitive adhesive sealing activating surfaces of the roll pair with the corresponding marginal edge portions of the form.

With reference now to FIG. 6, a fourth exemplary embodiment of the invention is shown which includes first and second roll pairs 142, 144 (the lower rollers of each pair not shown). The upper roller 146 of the first roller pair 142 includes enlarged end surfaces 148, 150, the peripheral end surface 148 being a longitudinal marginal edge pressure sealing surface for engaging longitudinal marginal edge portion 42 of the form 10. The opposite peripheral end surface 150 has a bearing function only, bearing only upon the lower roller in a similar manner to the bearing surfaces associated with roller pairs 78, 80 in the FIG. 4 embodiment. There is also a transverse edge sealing bar including a transverse edge sealing surface 152 extending between the surfaces 148, 150. Surface 152 insures transverse edge sealing of the forward transverse pressure sensitive adhesive strip 30 of the form 10. In this arrangement, however, the roller 146 is constructed of two axial portions 154, 156 in telescoping relationship to thereby enable the roll 146 to be adjustable in length to thereby accommodate forms of different widths.

The second roll pair 144 is substantially identical to the first roll pair 142 but is reversed so that the pressure sensitive adhesive strip along the opposite longitudinal marginal edge portion of the form can be activated. Specifically, the roller 158 is provided with enlarged end portions 160, 162, the latter being a longitudinal marginal edge pressure sealing surface for engaging longitudinal marginal edge portion 40 of the form 10. The opposite surface 160 has a bearing function only, engaging directly with the peripheral surface of the lower roller. A transverse sealing bar extends between the enlarged ends 160, 162 and includes a transverse edge sealing surface 164 which lies flush with surfaces 160, 162. This surface 164 insures pressure activation of the rearward transverse pressure sensitive adhesive strip 28.

It will thus be appreciated that by judicious selection of the longitudinal distance between the roll pairs 142, 144, and with the appropriate adjustment of the length of the rollers of each roll pair, forms of varying lengths and widths may be processed through the first and second roll pairs to effect perimeter edge sealing of successive forms 10.

Other arrangements are within the scope of this invention. For example, the roller pairs 46, 48 of the embodiment illustrated in FIG. 3 and the roller pairs 78, 80 of the embodiment illustrated in FIG. 4 may be constructed in the manner of the length-adjustable rollers in the roll pairs 142, 160 as shown in FIG. 6 to provide additional flexibility to these perimeter sealing systems, permitting perimeter sealing of forms of different lengths and widths.

It will also be appreciated that suitable conventional drive mechanisms may be utilized in the above described systems to effect coordination of the feed mechanism and the rotational velocity of the one or more roll pairs utilized in any particular arrangement. For example, a microprocessor may be utilized to manage the position of the transverse edge sealing surfaces of the individual roll pairs, the rotation of the rolls, and the movement of the stop gates so that the movement of the forms will be timed with the roll pairs to effect perimeter sealing in the desired location. Other drive systems, including mechanical and/or rotating, encoded pulse drives may be utilized. Pressures may be applied between the rollers of the individual roll pairs by hydraulic or spring loading, and adjustable bearers may be utilized to prevent or limit radial displacement of the individual rolls.

It is also contemplated that forms may be processed through the above described systems in either individual, separated form format or in a continuous format utilizing a tractor feed for registration. Since it is imperative to eliminate the conflict of meter feeding (tractor feed) and pressure feeding, the rollers would either be cammed apart between forms or the rollers would have built in pressure relief between the forms.

Depending upon the pattern of pressure sensitive adhesive, engraved or relieved roll pairs can also be relieved on the pressure surfaces so that only intermittent sealing is achieved. In this way, the paper web could be run incrementally faster or slower than the rollers. Within a small range of sizes of form heights, one pair of rollers could accommodate different repeats, as the form would be intermittently buckled or stretched during "spot" sealing.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for pressure activation of first and second longitudinally extending pressure sensitive adhesive strips located in longitudinal marginal edge portions of a business form, and third and fourth transversely extending pressure sensitive adhesive strips located in transverse marginal edge portions of the business form, the apparatus comprising:

a first pressure sealing roll pair including upper and lower rollers, one of said upper and lower rollers formed with enlarged end portions and a first transverse sealing surface extending between said enlarged end portions for activating one of said third and fourth transversely extending pressure sensitive adhesive strips;

a second pressure sealing roll pair including upper and lower rollers, one of said upper and lower rollers being formed with enlarged end portions and a second transverse sealing surface extending between said enlarged end portions for activating the other of said third and fourth transversely extending pressure sensitive adhesive strips, wherein said upper and lower rollers of said first and second pressure sealing roll pairs have parallel axes;

and further wherein the enlarged end portions of the first and second pressure sealing roll pairs have radii less than corresponding radii of said first and second transverse sealing surfaces in order to substantially equalize sealing pressure applied to said longitudinally and transversely extending pressure sensitive adhesive strips.

2. Apparatus for pressure activation of a plurality of pressure sensitive adhesive strips located in marginal edge portions of a business form having length and width dimensions, wherein a first pair of said pressure sensitive adhesive strips are arranged perpendicular to a second pair of said pressure sensitive adhesive strips, the apparatus comprising:

a first pair of vertically aligned pressure sealing rollers for applying pressure selectively only to one pressure sensitive adhesive strip of said first pair of pressure sensitive adhesive strips;

a second pair of vertically aligned pressure sealing rollers for applying pressure selectively only to the other of said pressure sensitive adhesive strips of said first pair of pressure sensitive adhesive strips, said second pair of pressure sealing rollers located downstream of said first pair of pressure sealing rollers a distance greater than the length dimension of the business form; and two pairs of laterally aligned pressure sealing rollers arranged downstream of said second pair of vertically aligned sealing rollers for applying pressure simultaneously to both of said second pair of pressure sensitive adhesive strips; wherein axes of rotation of all of said pressure sealing rollers are parallel.

3. The apparatus of claim 2 wherein said two pair of laterally aligned pressure sealing rollers are located downstream of said second pair of pressure sealing rollers a distance greater than the length dimension of the business form.

4. The apparatus of claim 2 wherein one pressure sealing roller of each of said first and second pairs of pressure sealing rollers has enlarged ends with bearer surfaces which directly engage a circumferential surface of the other pressure sealing roller of each of said first and second pairs of pressure sealing rollers, and a transverse sealing bar extending between said enlarged ends, and wherein said enlarged ends are spaced apart a distance greater than the width dimension of the business form.

5. The apparatus of claim 4 wherein said two pairs of laterally aligned pressure sealing rollers are spaced laterally a distance equal to a corresponding distance between the second pair of pressure sensitive adhesive strips.

6. The apparatus of claim 4 wherein said first pair of pressure sensitive adhesive strips extend along front and rear transverse margins of the business form, parallel to said axes of rotation of all of said pressure sealing rollers, and wherein said second pair of pressure sensitive adhesive strips extend along side marginal edges of the business form, perpendicular to said axes of rotation of all of said pressure scaling rollers.

7. The apparatus of claim 6 and further including stop gates located upstream of said first and second pairs of vertically aligned pressure sealing rollers for coordinating feeding of the business form with rotation of said first and second pairs of vertically aligned pressure sealing rollers to thereby insure successive engagement of said transverse sealing bars with said first pair of pressure sensitive adhesive strips.

8. The apparatus of claim 6 wherein the pressure sealing rollers of said two pairs of laterally aligned pressure scaling rollers each have a width dimension equal to a width dimension of each of said pressure sensitive adhesive strips extending along the side marginal edges of the business form.

* * * * *